(12) United States Patent
Markel et al.

(10) Patent No.: US 8,616,650 B2
(45) Date of Patent: Dec. 31, 2013

(54) HEAD SUPPORT

(75) Inventors: Christian Markel, Alzey (DE); Michael Wagner, St. Ingbert (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 261 days.

(21) Appl. No.: 13/155,913

(22) Filed: Jun. 8, 2011

(65) Prior Publication Data
US 2011/0304191 A1 Dec. 15, 2011

(30) Foreign Application Priority Data

Jun. 9, 2010 (DE) .......................... 10 2010 023 967

(51) Int. Cl.
*B60R 22/28* (2006.01)

(52) U.S. Cl.
USPC ............................ 297/408; 297/391; 297/410

(58) Field of Classification Search
USPC ................ 297/378.1, 408, 391, 410
See application file for complete search history.

(56) References Cited

U.S. PATENT DOCUMENTS

| | | | |
|---|---|---|---|
| 3,065,029 A | 11/1962 | Spound et al. | |
| 3,888,540 A | 6/1975 | Protze et al. | |
| 5,145,233 A * | 9/1992 | Nagashima | 297/408 |
| 6,074,010 A * | 6/2000 | Takeda | 297/391 |
| 6,074,011 A * | 6/2000 | Ptak et al. | 297/408 |
| 6,129,421 A * | 10/2000 | Gilson et al. | 297/408 |
| 6,508,512 B2 * | 1/2003 | Saberan et al. | 297/408 |
| 7,070,240 B2 * | 7/2006 | Schmitt et al. | 297/410 |
| 7,753,452 B2 * | 7/2010 | Suzuki et al. | 297/408 |
| 2006/0220433 A1* | 10/2006 | Yetukuri et al. | 297/408 |

FOREIGN PATENT DOCUMENTS

| | | |
|---|---|---|
| DE | 2 253 265 | 5/1974 |
| DE | 19517932 | 11/1996 |
| DE | 10145240 | 4/2003 |
| DE | 102005015167 | 10/2006 |
| WO | WO 94/01302 | 1/1994 |

* cited by examiner

*Primary Examiner* — Philip Gabler
(74) *Attorney, Agent, or Firm* — Cozen O'Connor

(57) ABSTRACT

A head support for a backrest of a motor vehicle seat, which can be folded out of an upright use position into a cargo position directed in driving direction. The head support is mounted to be foldable toward the front side of the backrest between an upright operative position is in the use position, and a folded down inoperative position when the backrest is in the cargo position, around a horizontal head support spindle of a holder arranged at the backrest and carries the head support the head support spindle extends transverse to the driving direction. The holder is lowered completely or partially into a lowered position in the backrest in the inoperative position of the head support and can be raised from the lowered position into the raised position of the operative position.

10 Claims, 6 Drawing Sheets

HEAD SUPPORT

BACKGROUND OF THE INVENTION

1. Field of the Invention

The invention is directed to a head support for a backrest of a motor vehicle seat that can be folded out of an upright use position into a cargo position directed in the driving direction, wherein the head support is mounted to be foldable toward the front side of the backrest between an operative position, which is upright when the backrest is in the use position, and an inoperative position which is folded down when the backrest is in the cargo position. The head support is rotatable around a horizontal head support spindle of a holder arranged at the backrest and carries the head support, which head support spindle extends transverse to the driving direction.

2. Description of the Related Art

Vertically adjustable head supports are frequently positioned too low by the user so that protection is not optimal.

In order that tall occupants of a motor vehicle seat are also optimally protected, head supports are also constructed, e.g., without vertical adjustment, in which the contact surface area of the head support must be enlarged toward the top for the head of the vehicle occupant. However, enlarging the head support toward the top leads to a collision with the vehicle roof when the backrest is folded forward and/or, in case of a back seat, leads to a collision with the front seat located in front of it, which prevents the back seat from being folded down completely into a horizontal position.

SUMMARY OF THE INVENTION

It is an object of the invention to provide a head support of the type mentioned above that allows the backrest to be folded without collisions in spite of a high contact surface area.

According to one embodiment of the invention, the holder is lowered completely or partially into a lowered position in the backrest in the inoperative position of the head support and can be raised from the lowered position into the raised position of the operative position.

As a result of this construction, the height of the head support can be reduced in a twofold manner in that it can be folded over on the one hand and can be lowered into the lowered position.

Accordingly, even under confined space conditions in the motor vehicle the head support can have an optimal height of the contact surface area in the operating state for every passenger and the backrest can nevertheless be folded into a horizontal position.

Raising of the holder is carried out automatically. The holder can be raised from the lowered position into the raised position by folding the head support out of the inoperative position into the operative position.

In this respect, the head support can be guided by a positive guide.

In a simple construction, a ramp-like guideway extends at right angles to the head support spindle along which a supporting region arranged at the edge of the head support facing the upper edge of the backrest can glide, which can be arranged at the upper edge of the backrest, and the path of the guideway extends from the front side to the back side of the head support and, in so doing, distances itself from the head support spindle.

Alternatively, it is also possible that a ramp-like guideway extends at right angles to the head support spindle and along which a supporting region arranged at the upper edge of the head support can glide and is arranged at the edge of the head support facing the upper edge of the backrest. The path of the guideway extends from the front side to the back side of the backrest and, in so doing, distances itself from the head support spindle.

In this connection, the guideway and/or the supporting region can extend across the width of the head support.

In a simple manner, the holder has one or more guide rods directed toward the upper edge of the backrest and are displaceably guided in corresponding guide openings of the backrest.

To economize on structural component parts, the holder is a one-piece, U-shaped stirrup, the free ends of the head support spindle being bent at right angles on both sides to form the guide rods.

The supporting region or guideway can be integrated in the head support when the head support forms a two-armed lever that is swivelable around the head support spindle, wherein the portion of the head support that is farther away from the upper edge of the backrest forms a first lever arm and the portion of the head support that is closer to the upper edge of the backrest forms a second lever arm, the supporting region or the guideway being arranged at the free end thereof.

In this connection, only small actuating forces are required to fold the head support when the first lever arm is longer than the second lever arm.

In the region of the upper edge of the backrest, the backrest has a shaft-like recess into which the head support is lowered in the inoperative position.

The vehicle seat also conveys a unified impression with the backrest in the operative position when the base area of the shaft-like recess is inclined downward in the driving direction when the backrest is upright.

The head support can be folded out of the operative position into the inoperative position at any folding angle. Depending upon the existing space conditions, the head support can advantageously be foldable out of the operative position into the inoperative position by a folding angle of greater than 90°.

In so doing, when the free end region of the head support in the inoperative position projects under the front area of a seat cushion of the vehicle seat, referring to the driving direction, this space can be used for storing the end region of the head support.

When the holder is spring-loaded in its operative position, an automatic lowering of the holder into its lowered position is also carried out when the head support is folded into the inoperative position.

An automatic displacement of the head support is prevented in the use position thereof when the head support can be locked against folding in its operative position.

The holder can likewise be protected against automatic displacement when the holder can be locked in its raised position against lowering into the lowered position.

For deliberate cancellation of locking, the head support and/or the holder can be locked by spring catches that can be disengaged manually. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment example of the invention is shown in the drawings and is described more fully in the following. In the drawings.

DETAILED DESCRIPTION OF THE PRESENTLY PREFERRED EMBODIMENTS

Figure 2:
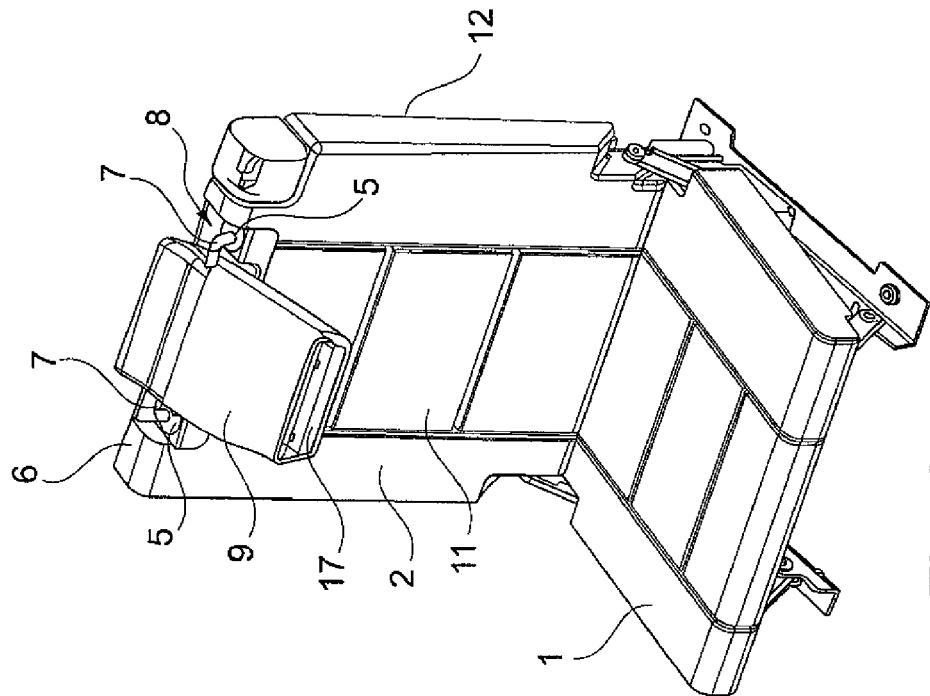
FIG. 2 is a perspective view of the motor vehicle seat according to FIG. 1 having the backrest in the use position and the head support in the inoperative position.

The motor vehicle seat shown in the drawings has an approximately horizontally oriented seat cushion 1 and a backrest 2.

Figure 1:
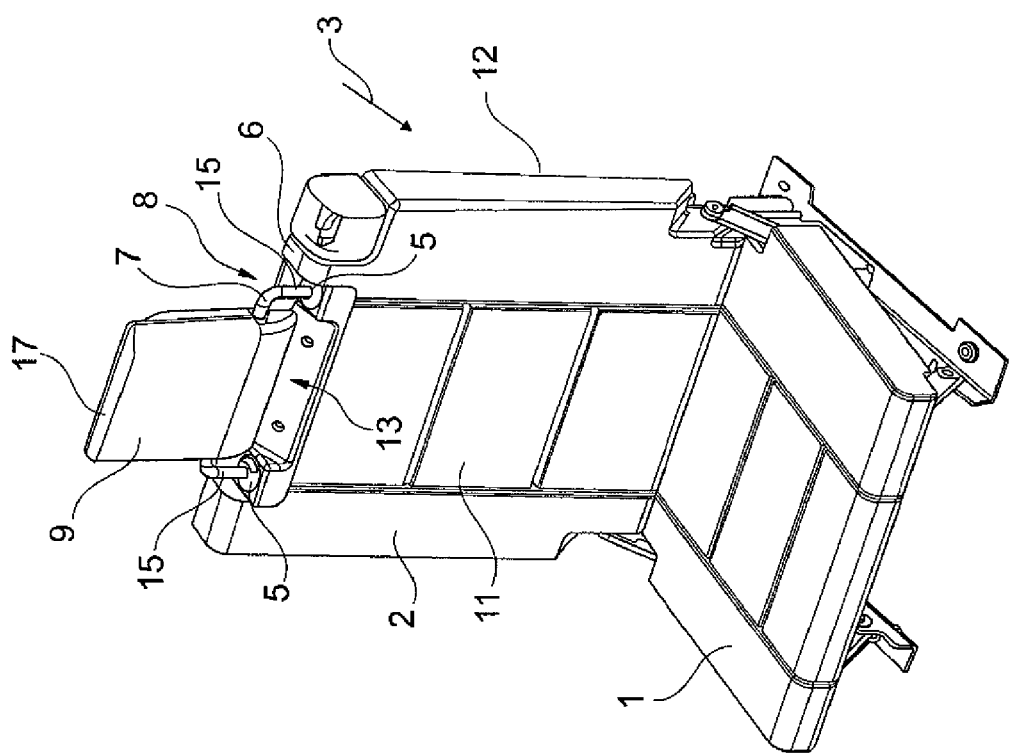
FIG. 1 is a perspective view of a motor vehicle seat having a backrest in the use position and a head support in the operative position.
Figure 3:
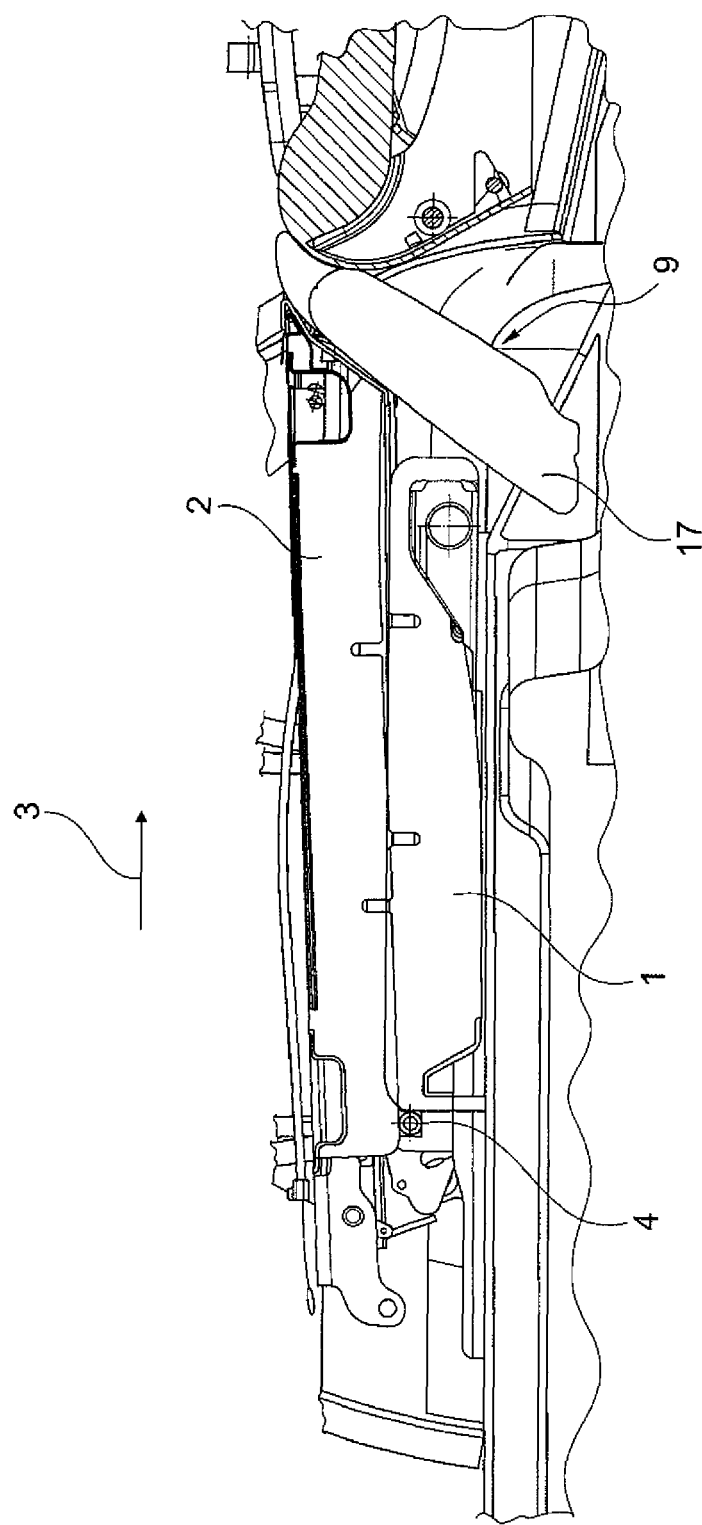
FIG. 3 is a side view of the motor vehicle seat according to FIG. 1 having the backrest in the cargo position and the head support in the inoperative position.

The backrest 2 can be folded out of the upright use position shown in FIGS. 1 and 2 in driving direction 3 around a folding axis 4 extending horizontally transverse to the driving direction 3 in its end region near the seat cushion 1 into a horizontal cargo position. (FIG. 3).

Two tubular guide openings 5 are formed in the backrest 2 transverse to the driving direction 3 at a distance from one another and extend approximately at right angles to the folding axis 4 and open outward at the upper edge 6 of the backrest 2.

Guide rods 15 project by their free ends into the guide openings 5 to be displaceable and are connected at their ends projecting out of the guide openings 5 through the head support spindle 7 to form a U-shaped stirrup extending parallel to the folding axis 4.

The stirrup forms a holder 8 for a head support 9. The head support 9 is not presently vertically adjustable in this embodiment.

Figure 4:
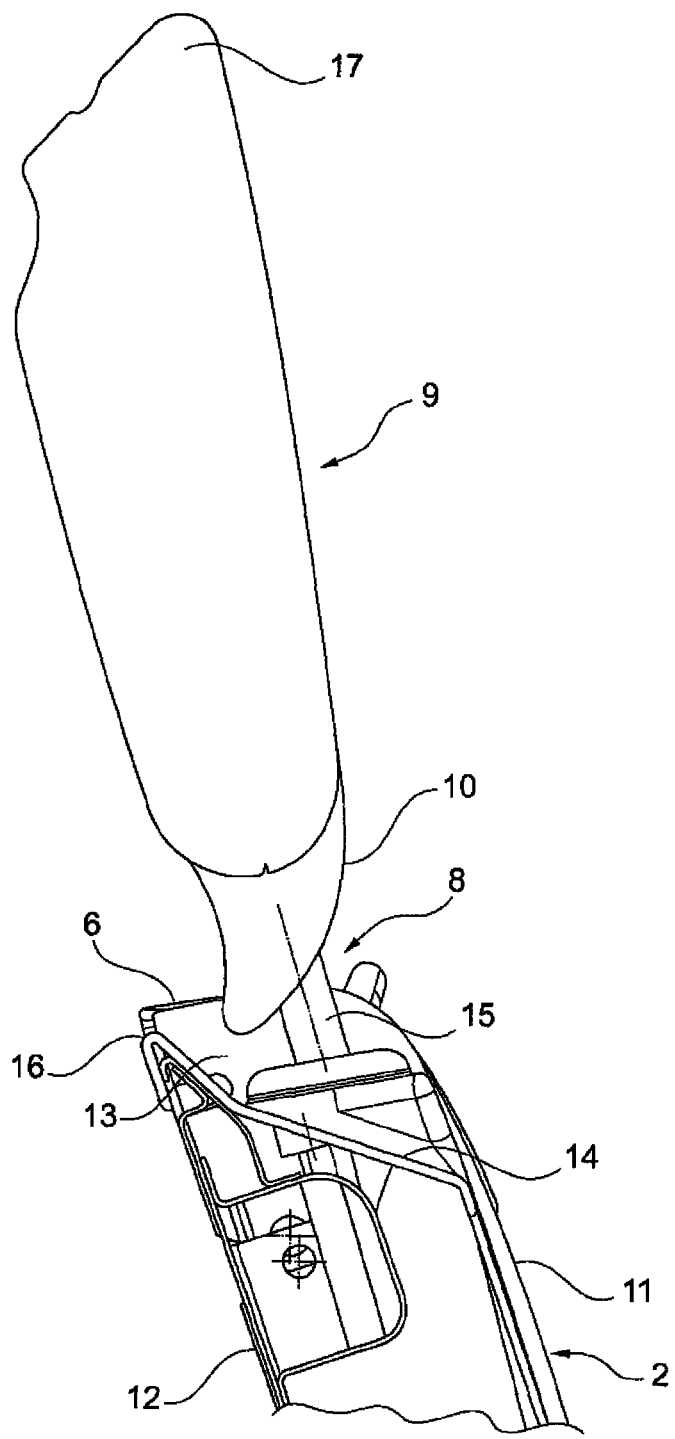
FIG. 4 is an enlarged section of the side view of the upper area of the backrest in the use position and the head support in the operative position.
Figure 6:
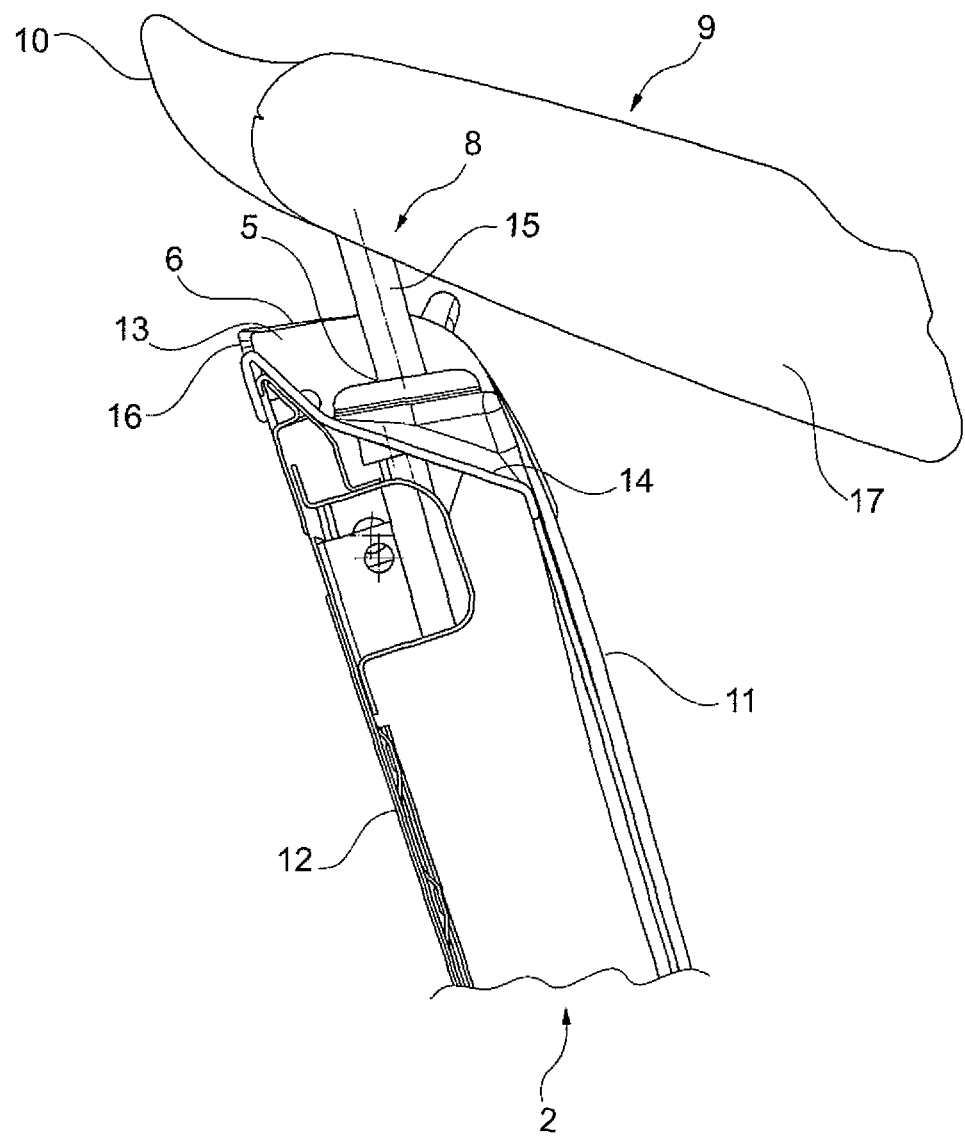
FIG. 6 is an enlarged section of the side view of the upper area of the backrest in the use position and the head support in the raised, completely folded down position.
Figure 7:
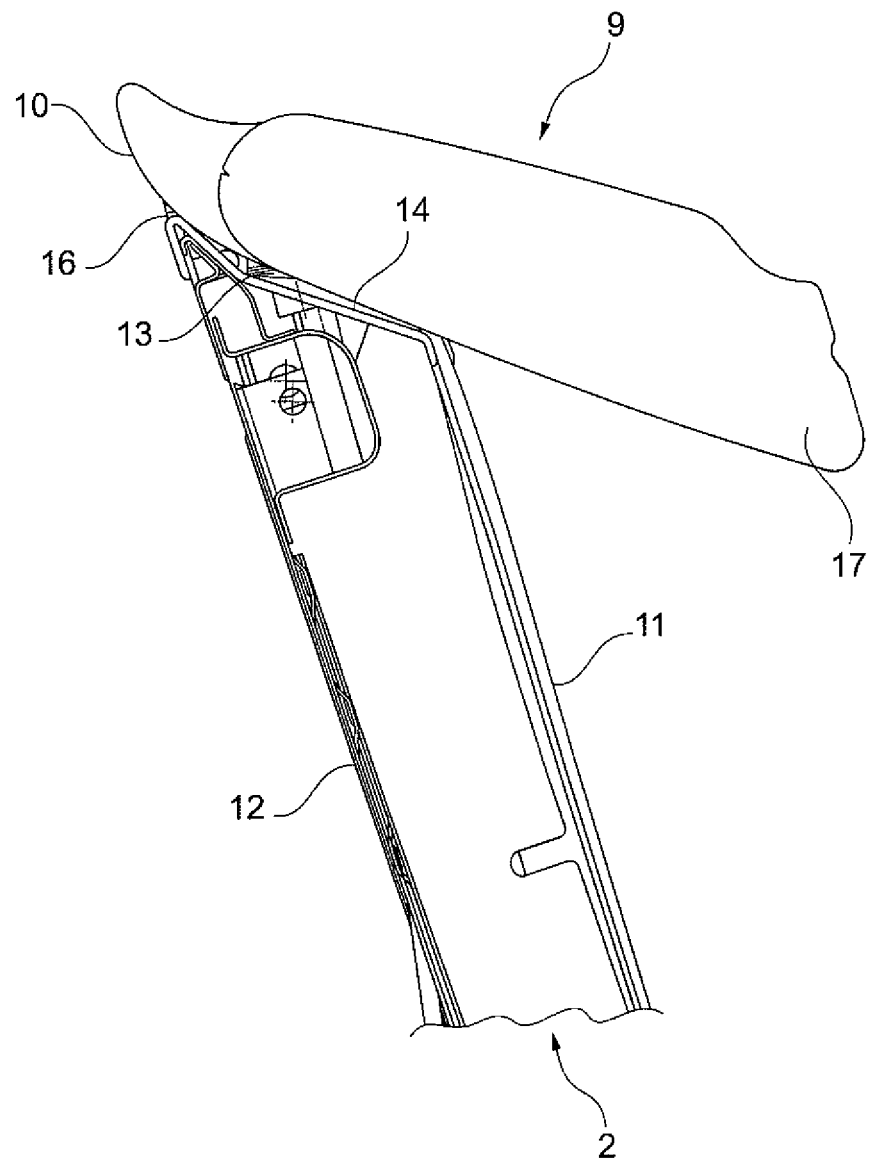
FIG. 7 is an enlarged section of the side view of the upper area of the backrest in the use position and the head support in the inoperative position.

The head support 9 is swivelable around the head support spindle 7 between an upright position, shown in FIGS. 1 and 4, and a folded down position shown in FIGS. 2, 6 and 7.

The head support spindle 7 projects through the head support 9 at a distance from the radial edge of the head support 9 to form a two-armed lever whose lever arm extending to the lower edge of the head support 9 is shorter than the lever arm extending to the upper edge of the head support 9.

A ramp-like guideway 10 is arranged at the lower edge of the head support 9 facing the upper edge 6 of the backrest 2. This guideway 10 extends in an approximately helical manner from the front side 11 to the back side 12 of the backrest 2 and, in so doing, its path distances itself from the head support spindle 7 from the front side 11 to the back side 12 of the backrest 2. (FIG. 4).

A shaft-like recess 13 which has approximately the same width as the head support 9 and whose base region 14 is inclined from the rear upper edge of the backrest 2 toward the front side of the backrest 2 is formed in the backrest 2 in the region of the upper edge 6 of the backrest 2.

The rear upper edge of the shaft-like recess 13 forms a supporting region 16.

The head support 9 can be locked in its operative position against folding by a locking device, not shown, which can be disengaged manually.

Figure 5:
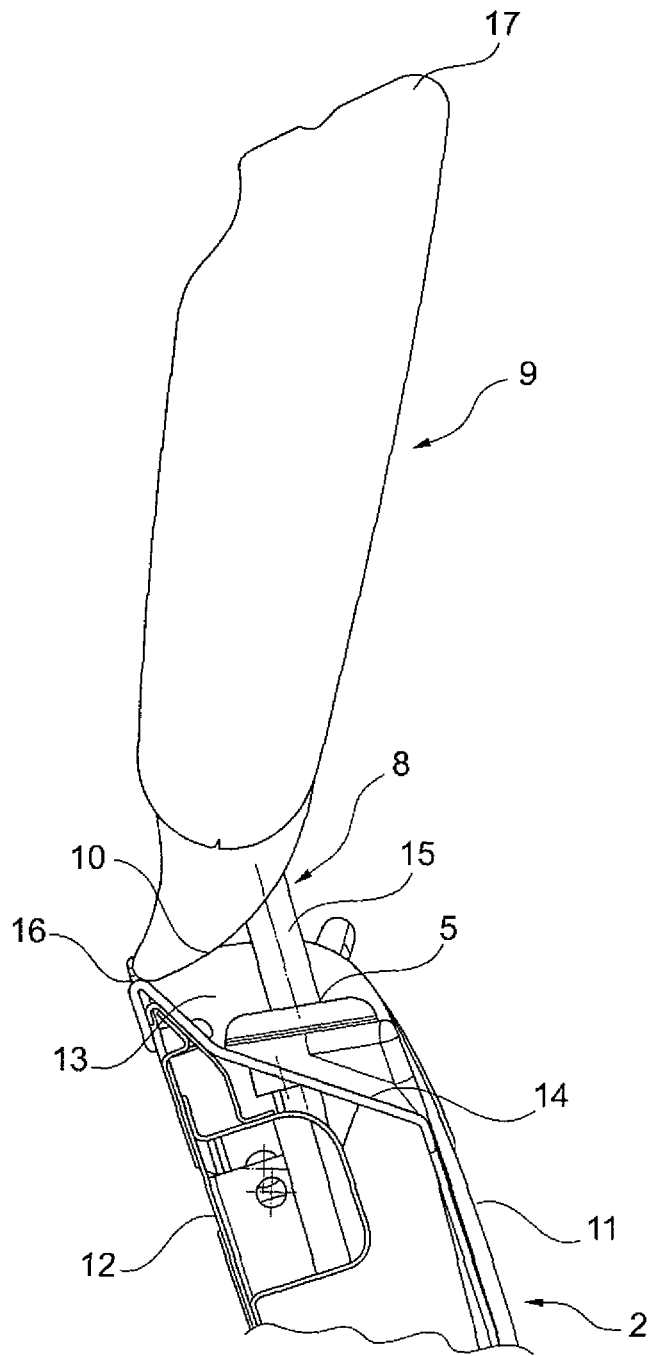
FIG. 5 is an enlarged section of the side view of the upper area of the backrest in the use position and the head support in the raised, partially folded position.

When the locking device is unlocked in the operative position of the head support 9 shown in FIGS. 1 and 4, the head support 9 can be folded forward (FIGS. 5 and 6) in driving direction 3 around the head support spindle 7.

To prevent head support 9 from moving into its lowered position (FIGS. 2 and 7) in which it is moved into the head support 9, the holder 8 is locked in its raised position (FIGS. 1, 4 and 5) by an additional locking device, not shown, which can be manually disengaged.

When the additional locking device is also disengaged, the holder 8, and, along with it, the head support 9, is lowered by a spring force acting on the holder 8 into its lowered position so that the head support 9 rests on the bottom region 14 of the shaft-like recess 13.

When the backrest 2 is folded out of its use position into its cargo position (FIG. 3), the free end region 17 of the head support 9 can project under the front region of the seat cushion 1 referring to the driving direction 3.

When the head support is folded up manually after the backrest 2 has been folded back out of the cargo position into the use position, the guideway 10 comes into contact with the supporting region 16 and slides along it.

The holder 8 is moved against the spring force in the guide openings 5 out of its lowered position into its raised position through the helical shape of the guideway 10.

In the raised position of the holder 8, this holder 8 is again locked. In this position of the holder 8, the head support 9, by folding up, has also reached its operative position again and is likewise locked again.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A head support for a backrest of a motor vehicle seat that is configured to be folded from an upright use position into a cargo position in a driving direction, the head support being foldably mounted so as to be foldable toward a front side of the backrest between an upright operative position when the backrest is in the use position and a folded down inoperative position when the backrest is in the cargo position, comprising:

a horizontal head support spindle, around which the head support rotates, that extends transverse to the driving direction; and a holder, arranged at the backrest, that carries the head support, the holder configured to be:

lowered at least partially from a raised position into a lowered position in which the holder is positioned at least partially within the backrest in the inoperative position of the head support, and raised from the lowered position into the raised position in response to folding of the head support out of the inoperative position into the operative position.

2. The head support according to claim 1, further comprising:

a ramp-like guideway that extends substantially perpendicular to the head support spindle along which a supporting region arranged at an upper edge of the backrest can glide is arranged at an edge of the head support facing the upper edge of the backrest, wherein the guideway has a path that ascends from a front side to a back side of the back rest and distances itself from the head support spindle.

3. The head support according to claim 2, wherein the holder comprises at least one guide rod directed toward the upper edge of the backrest and displaceably guided in a corresponding guide opening of the backrest.

4. The head support according to claim 3, wherein the head support forms a two-armed lever configured to be swivelable around the head support spindle, wherein the portion of the head support that is farther away from the upper edge of the backrest forms a first lever arm and the portion of the head support that is closer to the upper edge of the backrest forms a second lever arm, one of the supporting region and the guideway being arranged at the free end thereof.

5. The head support according to claim 1, wherein the head support forms a two-armed lever configured to be swivelable around the head support spindle, wherein the portion of the head support that is farther away from the upper edge of the backrest forms a first lever arm and the portion of the head support that is closer to the upper edge of the backrest forms a second lever arm, one of the supporting region and the guideway being arranged at the free end thereof.

6. The head support according to claim 1, wherein the backrest comprises a shaft-like recess in the region of the upper edge of the backrest, the head support being lowered into the shaft-like recess in the inoperative position.

7. The head support according to claim 1, wherein the head support is configured to be folded out of the operative position into the inoperative position by a folding angle of greater than 90°.

8. The head support according to claim 1, wherein the holder is spring-loaded in its operative position.

9. The head support according to claim 1, wherein the head support is configured to be locked against folding in its operative position.

10. The head support according to claim 1, wherein the holder is configured to be locked in its raised position against lowering into the lowered position.

* * * * *